United States Patent [19]

Daniels et al.

[11] Patent Number: 4,618,953
[45] Date of Patent: Oct. 21, 1986

[54] WATCHDOG CIRCUIT

[75] Inventors: Edward P. Daniels, Bridgeport; Risto A. Rinne, Jr., New Milford, both of Conn.

[73] Assignee: Pitney Bowes Inc., Stamford, Conn.

[21] Appl. No.: 605,733

[22] Filed: May 1, 1984

[51] Int. Cl.$^4$ .............................................. G06F 11/00
[52] U.S. Cl. .................................... 371/12; 364/200; 371/62
[58] Field of Search ................... 371/12, 62; 364/200, 364/900

[56] References Cited

U.S. PATENT DOCUMENTS

| | | | |
|---|---|---|---|
| 3,795,800 | 3/1974 | Nimmo | 371/12 |
| 4,072,852 | 2/1978 | Hogan et al. | 371/12 |
| 4,300,199 | 11/1981 | Yoknis et al. | 364/557 |
| 4,488,303 | 12/1984 | Abramovich | 371/62 |
| 4,513,417 | 4/1985 | Lamb et al. | 371/12 |
| 4,538,273 | 8/1985 | Lasser | 371/62 |
| 4,551,841 | 11/1985 | Fujita et al. | 371/12 |

Primary Examiner—Charles E. Atkinson
Attorney, Agent, or Firm—Robert H. Whisker; David E. Pitchenik; William D. Soltow, Jr.

[57] ABSTRACT

A watchdog circuit for improving the possibility of recovery from failures, such as those caused by static discharge or RF interference, in a data processing system. A data processing system includes a main, multi-chip processor for handling the main computational burden and a single-chip processor for handling I/O functions. Additionally, the main processor periodically sends status to the single-chip processor. If the single-chip processor does not receive status within a predetermined period it generates a reset signal to the main processor. In response to the reset signal the main processor interrogates the single-chip processor to determine if the reset was caused by a failure or a power-on condition. Because of its self contained construction the single-chip processor is less susceptible to static induced failures and will improve the recovery capabilities of the system when used to monitor the main processor.

17 Claims, 4 Drawing Figures

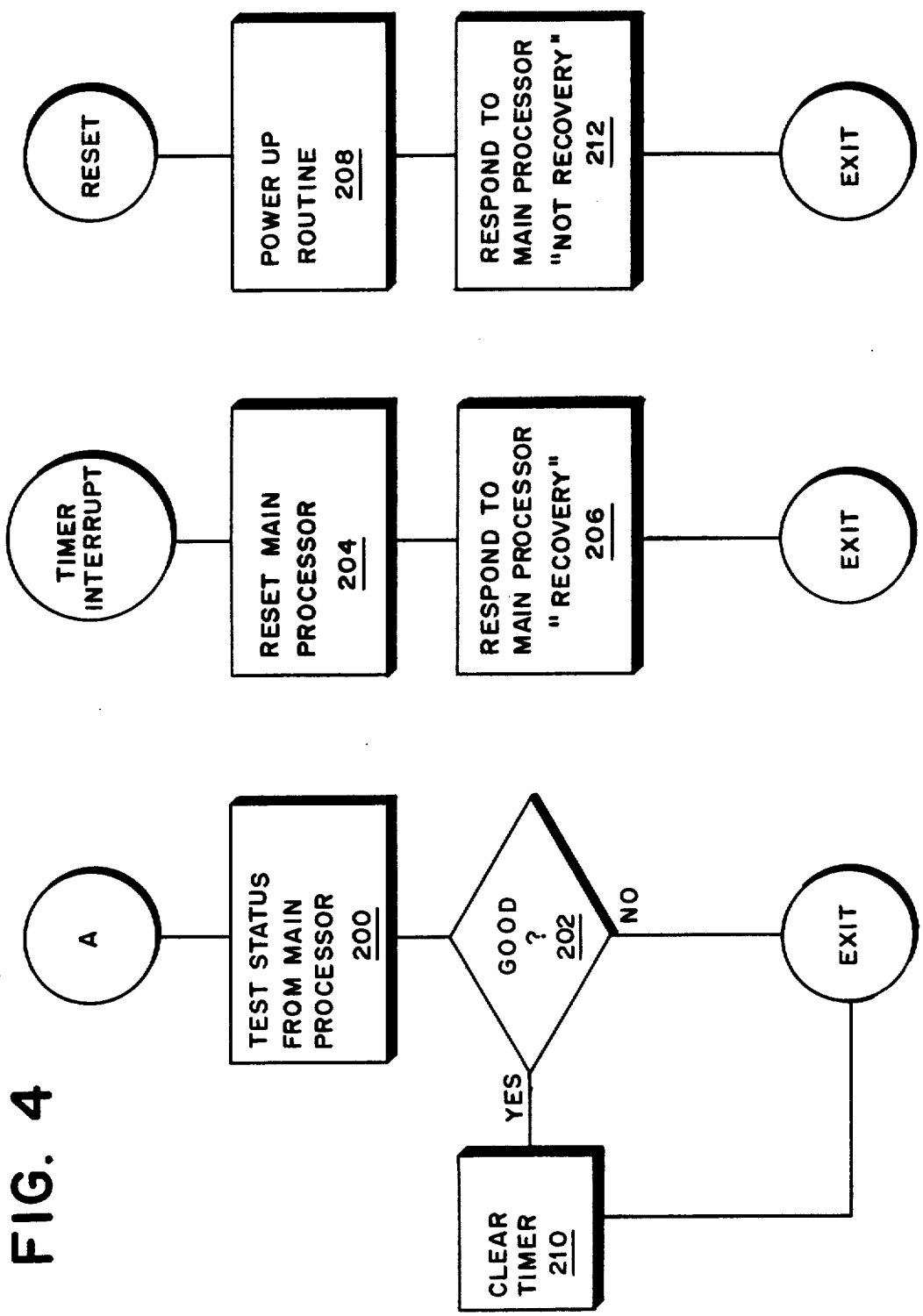

WATCHDOG CIRCUIT

BACKGROUND OF THE INVENTION

The introduction of data processing equipment into the office and shipping environments has created untold opportunities for improvements in practices and efficiency but has also created not a few new problems. Among these problems is the problem of static discharge. The slightly surprising, slightly annoying, slightly humorus little shocks that people get in dry weather can have very serious affects on electronic data processing equipment. Occasionally static discharge may physically damage equipment but, more frequently, the static discharge will merely disrupt the program sequence of the data processor; causing the system to appear to "go to sleep" (i.e., no longer respond to inputs). Such failures may also be caused by transient "glitches" on the power line supplying the equipment, RF interference or electromagnetic pulses.

Users find failures of this type particularly annoying since they not only cause at least delay and possibly the loss of valuable data but are also largely undiagnosable. Typically, the system will resume normal operation, less perhaps some data, upon being reset; leaving everyone to wonder just what happened. Because such failures are so exasperating to users and so difficult for field service personnel to deal with extensive efforts are made to reduce or eliminate the problem. Components are shielded, power supplies are filtered, anti-static mats are supplied and other steps are taken to reduce the occurence of these failures. But, because of the innumerable ways static or power supply transients may interact with a system it has generally proved impractical to completely eliminate all these various failure mechanisms at an economical cost. Thus, there remains a need for a low cost method for ameliorating the consequences of those failures which do occur.

Thus, it is an object of the subject invention to provide a low cost means for improving the capability to recover from failures such as those caused by static discharge in data processing systems.

It is a further object of the invention to provide such means which is compatible with other techniques used to reduce the rate of occurrence of such failures.

It is also an object of the subject invention to provide such a means which requires minimal modifications to the hardware and software of the data processing system and places a minimal additional computational burden on the system.

BRIEF SUMMARY OF THE INVENTION

The above objects are achieved and the disadvantages of the prior art are overcome by means of a data processing system comprising a main, multi-chip processor communicating with a single-chip processor and a reset circuit controlled by the single-chip processor for resetting the main processor. A timing apparatus is also operatively associated with the single-chip processor to measure the time elapsed between status receptions and to signal the single-chip processor. The single-chip processor resets the main processor if a pre-determined period of time elapses after a status transmission is received and before the next status transmission is received.

It should be noted that the subject invention includes not only "hard" resets (i.e., resets in response to a signal on a reset line) but may also include "soft" resets where the single-chip processor first attempts to establish I/O communications with the multi-chip processor before generating a "hard" reset signal. If such a "soft" reset is possible, data which would be lost in a "hard" reset may be saved. Thus the term "reset" as used in the present application should be understood to include both "hard" and "soft" resets.

In one embodiment of the subject invention the single-chip processor is operatively connected to input/output devices, and controls input/output operations for the system.

In another embodiment of the subject invention the main processor is programmed to execute operation cycles and is also programmed at at least the initial point in the operation cycle to transmit status to the single-chip processor. (By operation cycle herein is meant a sequence of programmed instructions executed by the main processor in order to carry out some task, typically in response to external inputs, which is characterized in that the cycle returns to its initial point within a determinable period) thus the main processor transmits status to the single-chip processor at intervals of no more than a pre-determined length so long as the main processors instructions sequence is not disturbed.

Those skilled in the art will recognize that the subject invention is particularly advantageous in that it makes use of existing components; a main, multi-chip processor, typically used for the major processing burden of a system, and a single-chip processor typically used for input/output control in a system, in a manner, which as will be described in detail below, which requires only minimal modifications to the hardware and software of the system to substantially ameliorate the problem of static discharge.

Other objects and advantages of the subject invention will be readily apparent to those skilled in the art from a consideration of the Detailed Description of the Preferred Embodiments of the Invention set forth below and the attached drawings.

BRIEF DESCRIPTION OF THE DRAWINGS

FIG. 4 shows a generalized flow chart of the operation of the single-chip processor in accordance with the subject invention.

DETAILED DESCRIPTION OF PREFERRED EMBODIMENTS OF THE INVENTION

Figure 1:
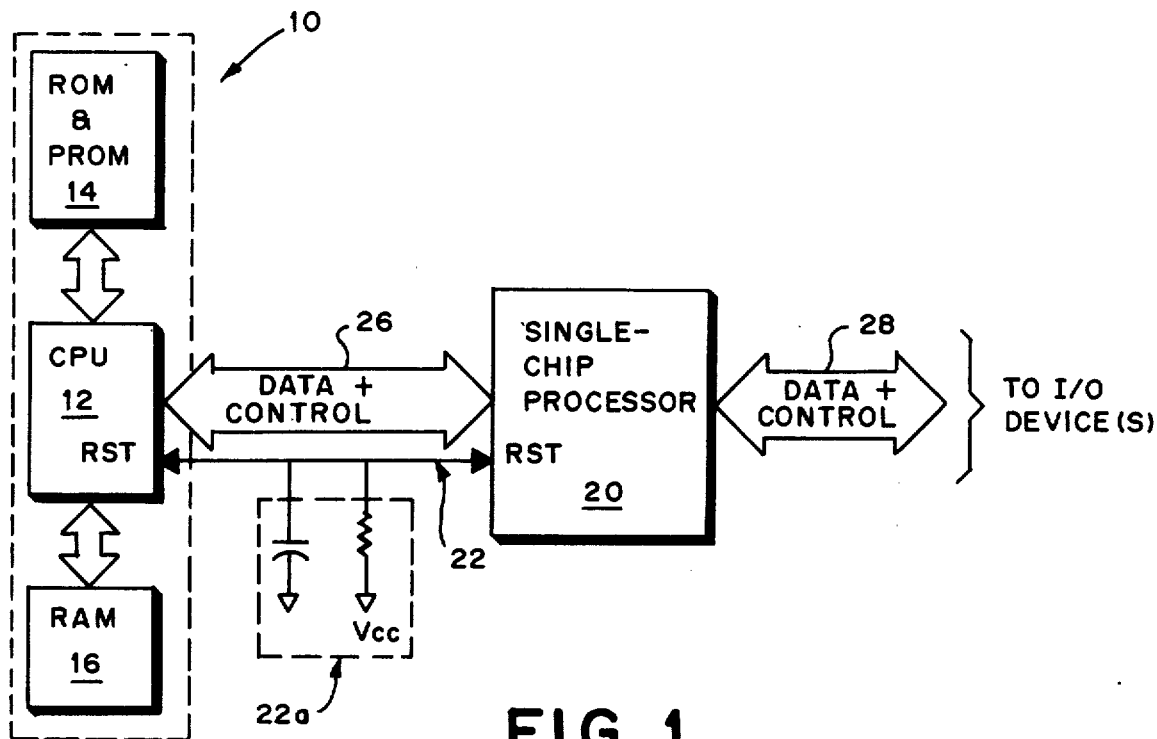
FIG. 1 shows a schematic block diagram of a typical prior art data processing system which might be used in a piece of office equipment or a shipping system.

A typical architecture for a data processing system intended for use in the office environment is shown in FIG. 1. A relatively powerful microprocessor, such as an Intel Model 8085, available from the Intel Corporation, Santa Clara, Calif., is used in main processor 10 to handle the main computational burden of the system while one (or more) less powerful single-chip processors 20, such as the Intel Model 8741, is used to handle input/output operations. Main processor 10 is programmed to execute various operation cycles in response to various inputs in order to carry out the intended task of the system. These tasks may be of almost any nature; ranging from general processing to the operation of any of a vast number of business machines. Details of the programming of such operation cycles is well within the ability of those skilled in the art and need not be discussed further here for an understanding of the subject invention; except to note that the program cycle must have the property of returning to an initial point within a determinable period of time, as will be explained further below.

CPU 12 of processor 10 is connected by a conventional bus structure 26 to single-chip processor 20. Single-chip processor 20, in turn, is connected by a conventional bus 28 to one or more input/output devices, not shown. Input/output operations are controlled by processor 20 in a conventional manner well understood by those skilled in the art to reduce the processing burden on main processor 10.

When power is initially turned on reset circuit 22, which includes RC network 22a, couples a reset pulse to the RST input of processors 10 and 20. In response to these inputs processors 10 and 20 execute their "power-up" routines.

Figure 2:
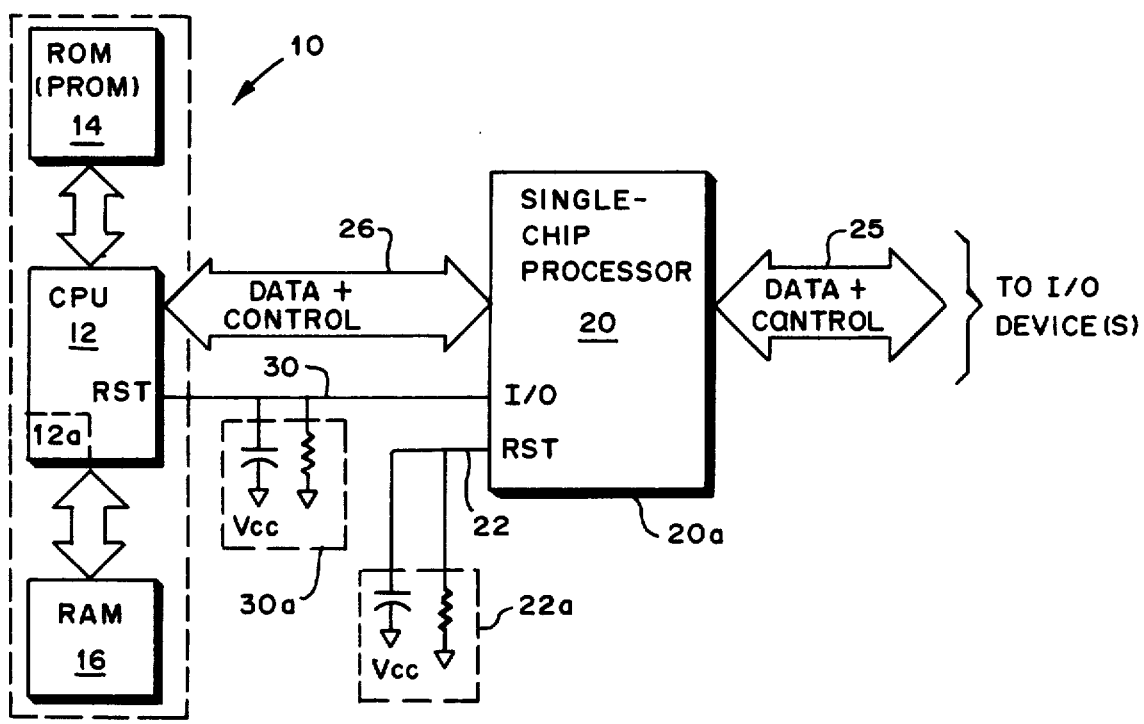
FIG. 2 shows a schematic block diagram of a data processing system in accordance with the subject invention.

In FIG. 2 the data processing system of FIG. 1 is shown modified in accordance with the subject invention. Reset circuit 22 is disconnected from the RST input of processor 10 and circuit 30 is connected in its place. Circuit 30 includes network 30a to provide a power-up signal for processor 10 and is also driven by a programmable output line, such as a data out or I/O line, of single-chip processor 20 to provide processor 20 with the capability to programmably restart processor 10.

FIG. 2 also shows programmable timer 20a. Timer 20a may be programmed by processor 20 to interrupt processor 20 when a predetermined period of time elapses and also may be reset, or cleared, by processor 20. Preferably timer 20a is an integral part of processor 20, such as the integral programmable timer provided in the Intel Model 8741, but timer 20a may also be provided by external circuitry.

The programs of processors 10 and 20 are modified to make use of the above described reset capability and programmable timer 20a to identify and recover from failures of processor 10 which are caused by static discharge, or other similar failures caused by power line transients or the like, as will be described below.

Figure 3:
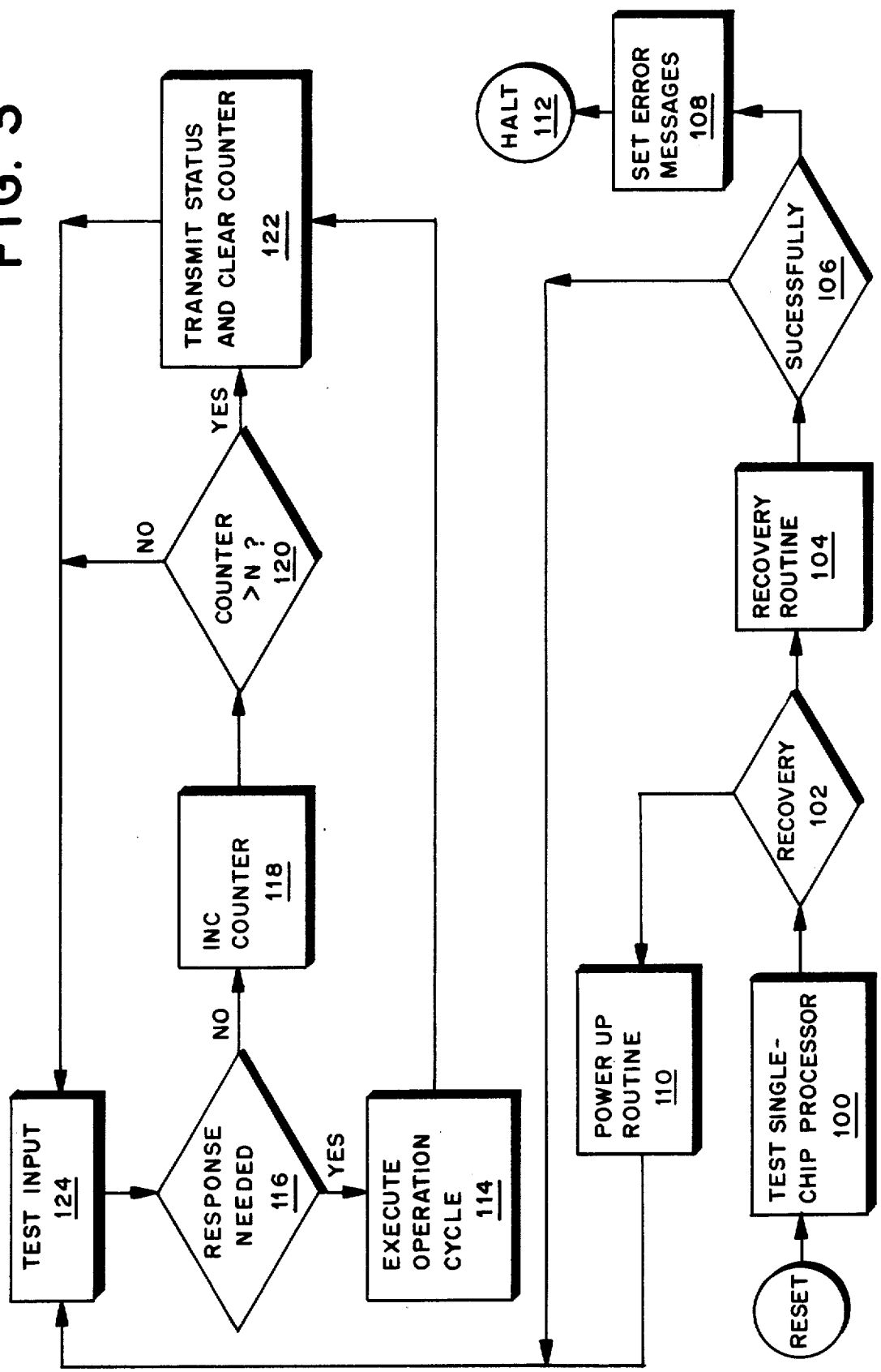
FIG. 3 shows a generalized flow chart of the operation of the main processor in accordance with the subject invention.

FIG. 3 shows a generalized flow chart of the operation of main processor 10 in accordance with the subject invention. In response to a signal on its RST input processor 10 tests processor 20 to determine whether the RST signal indicates a recovery from a static discharge induced failure or is a normal power-up restart. If the response to this test is negative processor 10 executes a conventional power-up routine at 110 and tests inputs at 124 to determine if a response is needed. At decision point 116 if it is determined that a response is needed processor 10 executes its operation cycle at 114. Those skilled in the art will recognize that the operation cycle shown at 114 is a generalization of all the innumerable responses which may be required to carry out the intended task of processor 10. As indicated above, programming for these tasks is conventional and a further description is not necessary here for an understanding of the subject invention. At the end of the operations cycle the processor transmits status to processor 20 at 122 and returns to test the input at 124.

If, at 116, no response is needed processor 10 increments an internal counter at 118 and tests at 120 to see if the counter exceeds a predetermined number. If it does not processor 10 returns again to test input at 124. If the counter does exceed the number processor 10 transmits status to processor 20 and clears the counter at 122 and returns the test input at 124.

Assuming that the operation cycle at 114 is always completed within a determinable amount of time the loop shown through test input 124 will assure that processor 10 transmits status to processor 20 within a predetermined amount of time. However, those skilled in the art will recognize that in general execution of the operation cycle at 114 may involve indeterminable waits for external inputs. If such waits do occur within the operation cycle at 114 it will be necessary to divide the cycle into subcycles and include similar loops for each subcycle to assure that status is always transmitted within a predetermined period.

At 102 if processor 10 determines that the reset signal does indicate a recovery it enters a recovery routine at 104. In the recovery routine processor 10 will examine its data to determine if it can meaningfully resume operations and, if it does so determine, branch back at 106 to test input at 124. If meaningful data is not available processor 10 may set error messages at 108 and halt at 112. Programming of the recovery routine at 104, as well as the error messages at 108 and halt at 112, will of course vary from system-to-system depending upon the particular task intended. The programming of such routines is in general conventional and well within the skill of those skilled in the art.

FIG. 4 shows a generalized flow chart of the programming for processor 20. Periodically processor 20 executes a routine at A to test status. Processor 20 tests the status from the main processor at 200 and it determines at 202 that the status is good it clears programmable timer 20a at 210 and exits back to its primary task, typically control of input/output operations. If the status is not determined to be good processor 20 exits directly. Thus, if a good status is not received within the predetermined time timer 20a will interrupt processor 20. In response to this interrupt processor 20 will reset the main processor at 204 and respond, at 206, to the main processor to indicate that this is a recovery. The processor then exits to its primary task.

In response to a signal on its RST input processor 20 enters a standard power-up routine at 208 and then responds to the main processor to indicate that this is not a recovery at 212 and then exits to its primary task.

Transmission of status and the testing of processors 10 and 20 is preferably carried out by I/O transfers between the processors, however, those skilled in the art will recognize that, if external interrupt inputs are available, status and tests may be performed by means of such external interrupts.

The use of single-chip processor 20 to monitor multi-chip processor 10 is fundamental to the subject invention because of the higher reliability of processor 20. Single-chip processor's are believed to have higher reliability to static discharge, RF interference, etc. because the self-contained construction of such single-chip processor's minimizes the connections to the processor, thus minimizing antenna which might couple such disturbances to the processor. Further, because of the self-contained construction of the single-chip processor's additional improvements in reliability may be achieved, at low cost, by shielding only single-chip processor 20 against static discharge. Still further improvements may be achieved by shielding the reset line from single-chip processor 20 to processor 10.

Because line 30 may also act as an antenna coupling static discharge energy, or similar disturbances into the RST input of processor 10 it is preferred that line 30 be shielded or otherwise hardened to avoid the possibility of introducing a new failure mode into the system. For maximum protection coaxial cable may be used for line 30.

The embodiments described above and illustrated in the attached drawings have been given by way of example only. Other embodiments of the subject invention will be readily apparent to those skilled in the art. Thus, limitations on the subject invention are to be found only in the claims set forth below.

What is claimed is:

1. A data processing system comprising:
   (a) a main, multi-chip processor;
   (b) a single-chip processor operatively associated with said main processor, said main processor transmitting and said single-chip processor receiving status information;
   (c) reset means, controlled by said single-chip processor, for resetting said main processor; and,
   (d) timing means operatively associated with said single-chip processor for measuring the time elapsed between said status receptions by said single-chip processor and for signaling said single-chip processor, said single-chip processor through said reset means resetting said main processor in response to said signal if a predetermined amount of time elapses after one of said status receptions and before the next of said receptions.

2. A data processing system as described in claim 1 wherein said single-chip processor is operatively connected to an input/output device and is programmed to control input/output operations for said systems.

3. A data processing system as described in claim 1 wherein said main processor is programmed to perform selected operation cycles and is also programmed to periodically transmit status to said single-chip processor at at least the initial point of said operation cycles, so that status is transmitted by said main processor to said single-chip processor at intervals of no more than a predetermine length so long as said main processors program sequence is not disrupted.

4. A data processing system as described in claim 2 wherein said main processor is programmed to perform selected operations cycles and is also programmed to periodically transmit status to said single-chip processor at at least the initial point of said operations cycles, so that the status is transmitted by said named processor to said single-chip processor at intervals of no more than a predetermined length so long as said main processors program sequence is not disrupted.

5. A data processing system as described in claim 3 wherein said timing means is a programmable timer which interrupts said single-chip processor upon expiration of said predetermined amount of time and said single-chip processor resets said main processor in response to said interrupt, and wherein further, said single-chip processor resets said timer upon receipt of status from said main processor and said predetermined amount of time is at least equal to said predetermined length of said interval.

6. A data processing system as described in claim 4 wherein said timing means is a programmable timer which interrupts said single-chip processor upon expiration of said predetermined amount of time and said single-chip processor resets said main processor in response to said interrupt, and wherein further, said single-chip processor resets said timer upon receipt of status from said main processor and said predetermined amount of time is at least equal to said predetermined length of said interval.

7. A data processing system as described in claim 1 wherein said single-chip processor is hardened to reduce its susceptibility to static discharge.

8. A data processing system as described in claim 2 wherein said single-chip processor is hardened to reduce its susceptibility to static discharge.

9. A data processing system as described in claim 3 wherein said single-chip processor is hardened to reduce its susceptibility to static discharge.

10. A data processing system as described in claim 5 wherein said single-chip processor is hardened to reduce its susceptibility to static discharge.

11. A data processing system as described in claim 5 wherein said reset means is hardened to reduce its susceptibility to static discharge.

12. A data processing system as described in claim 9 wherein said reset means is hardened to reduce its susceptibility to static discharge.

13. A data processing system as described in claim 1 wherein said status transmitted by said main processor includes data to be retrieved by said main processor from the single-chip processor during execution of a recovery routine.

14. A data processing system as described in claim 2 wherein said status transmitted by said main processor includes data to be retrieved by said main processor from said single-chip processor during the execution of a recovery routine.

15. A data processing system as described in claim 3 wherein said status transmitted by said main processor includes data to be retrieved by said main processor from said single-chip processor during the execution of a recovery routine.

16. A method of increasing reliability in a data processing system comprising a main multi-chip processor operatively associated with a single-chip processor, comprising the steps of:
   (a) repeatedly transmitting status from said main multi-chip processor to said single-chip processor within intervals of no more than a predetermined length; and,
   (b) resetting said main, multi-chip processor in response to a command from said single-chip processor if the interval between said status transmission exceeds said predetermined length.

17. The method of claim 16 wherein said single-chip processor controlls the input/output operations of said system.

* * * * *